US007361290B2

(12) United States Patent
Takeuchi et al.

(10) Patent No.: US 7,361,290 B2
(45) Date of Patent: Apr. 22, 2008

(54) ELECTROCONDUCTIVE RESIN, COMPOSITION USEFUL FOR FORMING ELECTROCONDUCTIVE RESIN, AND METHOD OF PRODUCING ELECTROCONDUCTIVE RESIN

(75) Inventors: Teruyoshi Takeuchi, Hamamatsu (JP); Kinro Hashimoto, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 434 days.

(21) Appl. No.: 10/812,101

(22) Filed: Mar. 30, 2004

(65) Prior Publication Data

US 2004/0188660 A1 Sep. 30, 2004

(30) Foreign Application Priority Data

Mar. 31, 2003 (JP) ............................ 2003-093790

(51) Int. Cl.
*H01B 1/06* (2006.01)
*C08K 9/00* (2006.01)
*B32B 5/00* (2006.01)

(52) U.S. Cl. ........................ 252/510; 428/98; 523/200; 523/206

(58) Field of Classification Search ................ 252/500, 252/502, 510; 428/98; 523/200, 206
See application file for complete search history.

(56) References Cited

U.S. PATENT DOCUMENTS

| | | | | |
|---|---|---|---|---|
| 4,016,022 | A * | 4/1977 | Browning et al. | 156/285 |
| 4,500,660 | A * | 2/1985 | Minamisawa et al. | 523/428 |
| 4,695,508 | A * | 9/1987 | Kageyama et al. | 442/149 |
| 4,749,748 | A * | 6/1988 | Inaike et al. | 525/113 |
| 4,883,712 | A * | 11/1989 | Ogawa et al. | 428/367 |
| 5,334,661 | A * | 8/1994 | Ochi et al. | 525/90 |
| 6,384,128 | B1 * | 5/2002 | Wadahara et al. | 524/496 |
| 6,453,960 | B1 * | 9/2002 | Kondo et al. | 152/451 |
| 6,465,098 | B2 * | 10/2002 | Mizuguchi et al. | 428/401 |
| 6,528,572 | B1 * | 3/2003 | Patel et al. | 524/495 |
| 6,815,491 | B2 * | 11/2004 | Adedeji et al. | 524/504 |
| 6,998,011 | B2 * | 2/2006 | Schoenfeld et al. | 156/331.4 |

FOREIGN PATENT DOCUMENTS

| | | | | |
|---|---|---|---|---|
| JP | 59-221371 | A | * | 12/1984 |
| JP | 36-1111333 | A | * | 5/1986 |
| JP | 36-2246923 | A | * | 10/1987 |

OTHER PUBLICATIONS

Gauthier et al., "Reinforcement Effects of Vapour Grown Carbon Nanofibres as Fillers in Rubbery Matrices," Composites Science and Technology, 65, pp. 335-343 (2005).*

Goncalez et al., "Composite Materials on Modified Epoxy Resins and Carbon Fiber," J. Braz. Chem. Soc., 17(6), pp. 1117-1123 (2006).*

* cited by examiner

*Primary Examiner*—Mark Kopec
*Assistant Examiner*—Jaison Thomas
(74) *Attorney, Agent, or Firm*—Jeffrey I. Auerbach; ESF, LLC.

(57) ABSTRACT

An object of the present invention is to provide a composition useful for forming an electroconductive resin, the composition comprising a resin and a vapor-growth carbon fiber compounded with the resin, and which can be easily formed into a thin film, and to provide an electroconductive resin which is made from the composition and has various functions such as electromagnetic shielding, electric-filed shielding, electrostatic elimination, and so forth.

A polar organic solvent of a film-forming component and a polar organic solvent of a vapor-growth carbon fiber are previously stirred to dissolve and disperse uniformly. The both solutions are mixed and then stirred to provide composition useful for forming electroconductive resin (solution). And the composition useful for forming electroconductive resin is solidified by reaction.

6 Claims, No Drawings

ELECTROCONDUCTIVE RESIN, COMPOSITION USEFUL FOR FORMING ELECTROCONDUCTIVE RESIN, AND METHOD OF PRODUCING ELECTROCONDUCTIVE RESIN

BACKGROUND OF THE INVENTION

1. Field of the Invention

The present invention relates generally to an electroconductive resin and particularly to a composition useful for forming an electroconductive resin, the composition comprising a resin and a vapor-growth carbon fiber compounded with the resin and capable of being easily formed into a thin film, an electroconductive resin made from the composition, and a method of producing the electroconductive resin.

2. Description of the Related Art

With the advances in electronics techniques, electroconductive materials for electrostatic elimination and electromagnetic shielding which are light in weight, have high strengths and high electro-conductivity, and have a thin-film shape, and also compositions useful for forming electroconductive coating materials, electroconductive adhesives, and the above-mentioned electroconductive materials have been in more demand. As materials having the aforementioned properties excluding the electroconductive property, high polymer type materials can be used. However, almost all the high polymer type materials have insulating properties. Thus, methods for rendering an electroconductive property to such materials have been investigated.

According to known methods of rendering an electroconductive property to high polymer type materials, generally, electro-conductivity-rendering substances such as carbon black and metallic type materials are dispersed and contained in the high polymer type materials. However, to obtain the required electroconductive property, it is necessary to add large amounts of conductivity-rendering materials. In the case in which metallic type materials are added, problems occur in that the weights of the formed compounds are very large in general, and the electroconductive properties tend to decrease because of time-dependent oxidation. Moreover, if a material is selected in which deterioration of the electroconductive property is suppressed, the cost becomes high. Thus, the selection of such a material is unsuitable for practical applications.

Referring to the addition of carbon black as a conductivity-rendering material, it is very difficult to uniformly disperse carbon black in a high polymer type material. For example, for electroconductive resin composite materials containing carbon particles such as carbon black or the like, there is a disadvantage in that the structure of the carbon black may be broken when the carbon black is kneaded with resins, or when the composite materials are molded into predetermined shapes, so that the electric resistances are easily varied. It is difficult to obtain desired electric resistances by use of carbon black (see Column of Prior Art and so forth of Japanese Examined Patent Application Publication No. 02-38614 (Patent Document 1)).

To solve the above-described problems, a method has been proposed in which a crushed vapor-growth type carbonaceous material is mixed with different types of synthetic resins, and then kneaded to attain dispersion (see Patent Document 1), and a method in which graphitized vapor-growth carbon fiber and carbon black are mixed with a synthetic resin, and kneaded by means of a mechanical kneading machine such as a two-roll mill, a kneader, an internal mixer, a Banbury mixer, or the like. Thus, a conductive resin composition is produced, and thereafter, is formed by pressing into a sheet (see Column "Means for Solving the Problems" and so forth of Japanese Unexamined Patent application Publication No. 07-997730 (Patent Document 2)).

However, the above-described methods of kneading to attain dispersion have the following problems. Since vapor-growth type carbonaceous materials have a large aspect ratio in general, the dispersion is extremely insufficient, and thus, a stable conductive property is obtained with great difficulty. Moreover, with respect to sheeting, after a conductive resin composition is produced, the composition is formed by pressing into a sheet or the like. Therefore, according to this method, it is difficult to form the composition into a very small, homogeneous sheet or thin film.

SUMMARY OF THE INVENTION

Accordingly, it is an object of the present invention to provide a composition useful for forming an electroconductive resin, the composition comprising a resin and a vapor-growth carbon fiber compounded with the resin, and which can be easily formed into a thin film, and to provide an electroconductive resin which is made from the composition and has various functions such as electromagnetic shielding, electric-field shielding, electrostatic elimination, and so forth.

The inventors have investigated various ways to solve the above-described problems of the known techniques, and have found that vapor-growth carbon fibers, which are electroconductive materials, are capable of being sufficiently dissolved in polar organic solvents. Based on these findings, the present invention has been devised. In particular, according to the present invention, a composition useful for forming an electroconductive resin comprises a film-forming component and a vapor-growth carbon fiber compounded with the film-forming component.

Moreover, according to the present invention, a method of producing an electroconductive resin is provided in which the above-described composition is solidified by reaction, if the reaction is necessary.

Furthermore, according to the present invention, an electroconductive resin is provided which comprises a product from the reaction of a composition.

It is to be noted that in the present invention, a composition useful for forming an electroconductive resin is one in which an electro-conductivity-rendering material is added to a resin composition.

As described above, the composition useful for forming an electroconductive resin comprises a film-forming component and a vapor-growth carbon fiber compounded with the film-forming component. In ordinary cases, the composition useful for forming an electroconductive resin is dissolved in and diluted with a polar organic solvent, and is used as a solution.

The above-described film-forming component is not restricted to particular compounds, provided that the film-forming component is a liquid-type polymer soluble in a polar organic solvent such as a liquid rubber component or a liquid resin component. Preferably, the film-forming component is a mixed component of an organic polymer having both end-groups substituted by carboxyl groups in a molecular chain such as liquid acrylonitrile-butadiene rubbers, liquid styrene-butadiene rubbers, liquid polybutadiene, liquid polyisoprene, liquid polychloroprene, or the like, and an epoxy resin such as bisphenol A diglycidyl ether type epoxy resins, bisphenol F diglycidyl ether type epoxy resins, phenol novolac type epoxy resins, or the like. Preferably, the film-forming component is a mixed component of a liquid acrylonitrile-butadiene rubber having both end-groups substituted by carboxyl groups and a bisphenol A diglycidyl ether type epoxy resin.

The liquid acrylonitrile-butadiene rubber having both end-groups substituted by carboxyl groups is represented by the following chemical formula 1:

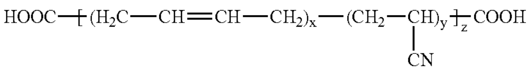

in which subscript x represents a natural number of 5 or 6, subscript y represents a natural number of 1 or 2, and subscript z represents a natural number of 10 to 12.

Liquid acrylonitrile-butadiene rubbers having both end-groups substituted by carboxyl groups having a viscosity of 55,000 to 625,000 cPs (27° C.), a molecular weight of 3,000 to 4,000, and an acrylonitrile content of 10 to 27% are more preferable. For example, Hycar CTBN (trade name, manufactured by BFGoodrich Co.) is commercially available as liquid acrylonitrile-butadiene rubber having both end-groups substituted by carboxyl groups.

Moreover, the above-described bisphenol A diglycidyl ether type epoxy resin has both-terminal epoxy rings in a molecular chain. The viscosity is in the range of 11,000 to 15,000 cPs (25° C.). For example, the bisphenol A diglycidyl ether type epoxy resin is represented by the following chemical formula 2:

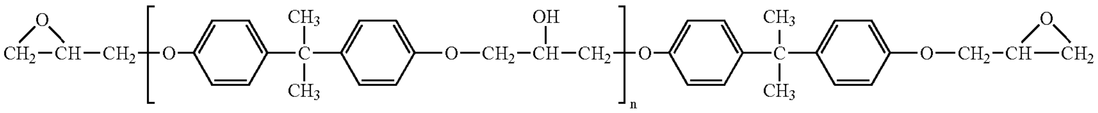

in which n represents an integer of 0 to 2. For example, DER331 (trade name, manufactured by Dow Chemical Japan Ltd.) is commercially available as a bisphenol A diglycidyl ether type epoxy resin.

Hereinafter, an embodiment of the present invention will be described, in which the film-forming component comprising a liquid acrylonitrile-butadiene rubber having both end-groups substituted by carboxyl groups and a bisphenol A diglycidyl ether type epoxy resin is used. Ordinarily, the mixing-ratio by weight of the liquid acrylonitrile-butadiene rubber having both end-groups substituted by carboxyl groups and the bisphenol A diglycidyl ether type epoxy resin is 100:30.

Referring to the resin composition, which is a film-forming component, and is a mixture of the liquid acrylonitrile-butadiene rubber having both end-groups substituted by carboxyl groups and the bisphenol A diglycidyl ether type epoxy resin, the viscosity is excessively high and, thus, is very viscous. Therefore, it is difficult to handle or process, e.g., agitate the composition. Accordingly, an appropriate amount of an organic solvent is added, so that the composition is diluted to form a 30 to 50 weight percent solution. Thus, the resin composition is used in a mixed solution. As the organic solvent, polar organic solvents such as acetone, methyl ethyl ketone, dichloromethane, chloroform, and the like are desirable.

Ordinarily, the vapor-growth carbon fiber is formed from carbon only. In the initial forming stage, raw carbon fibers are formed. In this stage, the carbon fibers are grown in the longitudinal direction by the catalytic action of a transition metal such as iron, nickel, or the like. Thereafter, heat-decomposed carbon fiber layers are deposited in the peripheries of the raw carbon fibers. Thus, vapor-growth carbon fibers are formed. For the produced vapor-growth carbon fibers, ordinarily, the fiber diameter is in the range of 100 nm to 200 nm, the fiber length is in the range of 10 to 20 μm, and the ratio of the fiber length to the fiber diameter, i.e., an aspect ratio thereof is in the range of 50 to 200. Each of the carbon fibers has a cross-section in a pattern of concentric circles laminated around the hollow fiber axis like growth rings. For example, VGCF (trade name, manufactured by Showa Denko K. K.) is commercially available as a vapor-growth carbon fiber.

The above-described composition useful for forming an electroconductive resin is produced by compounding the vapor-growth carbon fiber as an electro-conductivity rendering material with the film-forming component. The compounding-ratio of the vapor-growth carbon fiber can be appropriately selected. Ordinarily, the compounding-ratio is in the range of 1 to 20 parts by weight, preferably, 5 to 15 parts by weight based on 100 parts by weight of the film-forming component. Referring to the compounding of the film-forming component and the vapor-growth carbon fiber, preferably, the film-forming component and the vapor-growth carbon fiber are independently dissolved or dispersed in polar organic solvents prior to the compounding, and thereafter, are mixed with each other. In this case, the produced liquid, obtained by the mixing, is sufficiently stirred to uniformly disperse.

To the composition useful for forming an electroconductive resin, a tertiary amine may be added, if necessary, as a reaction-catalyst to accelerate the reaction in a reaction process which will be described below. The tertiary amine catalyst is not restricted to particular compounds. For example, as the tertiary amine catalyst, N,N-dimethylmethaneamine, N,N-diethylethaneamine, N,N-dipropylpropaneamine, N,N-dibutylbutaneamine, N, N-diphenylbenzeneamine, or like may be used. The amount of the tertiary amine catalyst added has no particular limitation. Ordinarily, the amount is in the range of 1 to 2 parts by weight based on 100 parts by weight of the film-forming component.

Referring to the method of producing an electroconductive resin comprising solidifying the composition useful for forming an electroconductive resin by reaction, if the reaction is necessary, the composition useful for forming an electroconductive resin, prepared as described above, may be heated at a proper reaction temperature for an appropriate time-period. The reaction temperature and the reaction time-period have no particular limitations. Ordinarily, when no tertiary amine catalyst is used, the reaction temperature is in the range of 150 to 180° C., and the reaction time-period is in the range of 30 to 40 hours. When a tertiary amine catalyst is used, the reaction temperature is in the range of 150 to 180° C., and the reaction time-period is in the range of 16 to 20 hours. The above-described reaction can form a black-color film which is flexible and has a high adhesive property, using a sufficient reaction time-period, even if no tertiary amine catalyst is used.

The reaction mechanism by which the electroconductive resin is formed when the amine catalyst is used is supposed as follows. First, the carboxyl substituents of the liquid acrylonitrile-butadiene rubber react with the tertiary amine catalyst to form a carboxyl salt. The produced carboxyl salt rapidly reacts with the bisphenol A diglycidyl ether type epoxy resin, so that the tertiary amine is released, and a high polymer chain extending reaction proceeds. These reactions are repeated to form a high polymer chain. The tertiary amine catalyst, after it reacts with the carboxyl salt, reacts with the so-called pendant type hydroxyl groups which are produced by reaction of the carboxyl groups with the epoxy rings. The amine catalyst induces a crosslinking reaction with the bisphenol A diglycidyl ether type epoxy resin. Thus, a product having a three dimensional structure which is a high polymer compound is produced.

In the case in which the electroconductive resin is formed in a predetermined shape while the above-described reaction is carried out, a method of pouring the composition useful for forming an electroconductive resin into a predetermined mold, a method of casting the composition into a mold, or coating the composition onto the surface of a piece may be employed. As the coating method, known coating methods such as roll-coating, spin-coating, spray-coating, dipping, manual coating using a brush, and the like may be used.

The electroconductive resin according to the present invention is produced, e.g., by reaction of the composition useful for forming an electroconductive resin. The electroconductive resin produced by the reaction is a black-color material which is flexible and has a high adhesive property. For example, the electroconductive resin has a volume resistivity of not more than $10\times10^{0}$ Ω·cm, and a coefficient of variation of the standard deviation of not more than 10%, preferably, not more than 3%. Moreover, the electroconductive resin may be produced in a sheet or thin-film with a smooth surface having a thickness of not more than 1 mm, preferably, not more than 0.5 mm. As described above, according to the present invention, an electroconductive resin having a low volume resistivity, a small dispersion of the volume resistivity, and a small thickness can be produced. Thus, the electroconductive resin is useful as electromagnetic shielding, electric-field shielding, electrostatic elimination materials in a variety of fields.

In the case in which the electro-conductivity-rendering material is not added to the resin composition, a cured product, which is not electroconductive, can be obtained as a thin film material which is flexible and has a brown color. Thus, for example, the product can be used for heat-resistant thin film sheets, prepreg resins, chemical-resistant sheets, and the like.

DESCRIPTION OF THE PREFERRED EMBODIMENTS

Hereinafter, the present invention will be more specifically described with reference to Examples. The present invention is not restricted to the Examples.

EXAMPLE 1

To 40 ml of dicyclomethane as a polar organic solvent, 25.0 g of Hycar CTBN 1300×8 (trade name, manufactured by BFGoodrich Co.), 7.5 g of DER331 (trade name, manufactured by Dow Chemical Japan Ltd.), and 0.45 g of N,N-dibutylbutaneamine as a curing catalyst were added and stirred by means of a magnet stirrer to dissolve. Separately, 1.25 g of VGCF (trade name, vapor-growth carbon fiber, manufactured by Showa Denko K.K.) was added to 50 ml of dichloromethane and sufficiently stirred to disperse. The above-described solution and dispersion were mixed with each other and stirred for 3 hours while heating at a temperature of 35 to 38° C. by means of a magnet stirring device having a high precision heating function. Thus, a solution of a composition useful for forming an electroconductive resin was obtained, in which the vapor-growth carbon fiber was uniformly dispersed.

Separately, an iron plate made of S50C with a size of 200 mm×200 mm was prepared, of which the smooth surface was coated with perfluoroalkoxyalkane (PFA). A mold having an inside size of 200 mm×100 mm×0.5 mm in height was placed on the surface of the plate. The above-described dispersion of the composition was cast into the mold. This iron plate was let to stand still for 20 hours in an anti-explosive type electric oven of which the temperature was controlled to 150° C., so that the resins were caused to react and be cured.

After the curing reaction, the formed electroconductive resin could be easily peeled off from the surface of the iron plate without being broken. Thus, an electroconductive resin sheet with a thickness of 0.4 mm was formed. The formed sheet had a smooth surface and was black in color. The volume resistivity of this sheet was measured by means of a Loresta HP (manufactured by MITSUBISHI CHEMICAL CORPORATION) according to the Four-Probe method of JIS (Japanese Industrial Standard) K7194. The volume resistivity was measured at nine points of a sample sheet, i.e., eight points set along a line positioned 2.5 cm inside of the sides of the sample sheet at equal intervals and one point at the center of the sample sheet. The simple average of the nine measurements was taken as a measurement value. The standard deviation and the coefficient of variation were calculated based on the originally obtained measurement data, and are shown, together with the main manufacturing conditions for the sheets, in Table 1.

EXAMPLE 2

In Example 2, a sheet with a thickness of 0.4 mm made of an electroconductive resin was produced in the same manner as that in Example 1 except that the amount of vapor-growth carbon fiber was 2.5 g, and 80 ml of dichloromethane as an organic polar solvent was used. Similarly to Example 1, the volume resistivity of the produced sheet was measured, and the simple average, the standard deviation, and the coefficient of variation were calculated, and are shown, together with the main manufacturing conditions for the sheets, in Table 1.

EXAMPLE 3

In Example 3, a sheet with a thickness of 0.2 mm made of an electroconductive resin was produced in the same manner as that in Example 1 except that the amount of vapor-growth carbon fiber was 3.45 g, 80 ml of dichloromethane as an organic polar solvent was used, and the height of a mold placed on the surface of the iron plate was 0.2 mm. Similarly to Example 1, the volume resistivity of the produced sheet was measured, and the simple average, the standard deviation, and the coefficient of variation were calculated, and are shown, together with the main manufacturing conditions for the sheet, in Table 1.

EXAMPLE 4

In Example 4, a sheet with a thickness of 1.2 mm made of an electroconductive resin was produced in the same manner as that in Example 1 except that the amount of vapor-growth carbon fiber was 4.4 g, 80 ml of dichloromethane as an organic polar solvent was used, and the height of a mold placed on the surface of the iron plate was 1.4 mm. Similarly to Example 1, the volume resistivity of the produced sheet was measured, and the simple average, the standard deviation, and the coefficient of variation were calculated, and are shown, together with the main manufacturing conditions for the sheet, in Table 1.

EXAMPLE 5

In Example 5, a sheet with a thickness of 0.4 mm made of an electroconductive resin was produced in the same manner as that in Example 1 except that the amount of vapor-growth carbon fiber was 5.0 g, and 80 ml of dichloromethane as an organic polar solvent was used. Similarly to Example 1, the volume resistivity of the produced sheet was measured, and the simple average, the standard deviation, and the coefficient of variation were calculated, and are shown, together with the main manufacturing conditions for the sheet, in Table 1.

EXAMPLE 6

In Example 6, a sheet with a thickness of 0.4 mm made of an electroconductive resin was produced in the same manner as that in Example 1 except that the amount of vapor-growth carbon fiber was 5.0 g, 80 ml of dichloromethane as an organic polar solvent was used, no tertiary amine as a reaction catalyst was added, and the reaction time was increased to 40 hours. Similarly to Example 1, the volume resistivity of the produced sheet was measured, and the simple average, the standard deviation, and the coefficient of variation were calculated, and are shown, together with the main manufacturing conditions for the sheet, in Table 1.

EXAMPLE 7

In Example 7, a sheet with a thickness of 0.1 mm made of an electroconductive resin was produced in the same manner as that in Example 1 except that no growth carbon fiber was added, and the height of a mold placed on the surface of the iron plate was 0.1 mm. The produced sheet was a thin-film piece with a smooth surface which was flexible and brown.

Comparative Example 1

In Comparative Example 1, a sheet with a thickness of 0.4 mm made of an electroconductive resin was produced in the same manner as that in Example 1 except that 5.0 g of KETJEN EC (trade name, manufactured by The Lion Co., Ltd.) was used as an electro-conductivity-rendering material, instead of the vapor-growth carbon fiber. The produced sheet was visually observed. The film-surface was very rough. That is, the sheet did not substantially have a thin-film shape. Similarly to Example 1, the formed thin film could be easily peeled off from the surface of the iron plate without being broken. The volume resistivity of this sheet was measured by means of a Loresta HP (manufactured by MITSUBISHI CHEMICAL CORPORATION) according to the Four-Probe method of JIS (Japanese Industrial Standard) K7194. The film surface was very inferior with respect to the shape and size. It was estimated that the measured values had a large error, so that the measured values were not satisfactory.

TABLE 1

| | Example | | | | | | Comparative |
|---|---|---|---|---|---|---|---|
| | 1 | 2 | 3 | 4 | 5 | 6 | example 1 |
| Amine catalyst*[1] in parts by weight | 1.4 | 1.4 | 1.4 | 1.4 | 1.4 | Not added | 1.4 |
| Electroconductive material*[2] | VGCF | VGCF | VGCF | VGCF | VGCF | VGCF | EC |
| Amount of electroconductive material added in parts by weight | 3.8 | 7.7 | 10.6 | 13.5 | 15.4 | 15.4 | 15.4 |
| Thickness of sheet mm | 0.4 | 0.4 | 0.2 | 1.2 | 0.4 | 0.4 | 0.4 |
| Volume resistivity Ω · cm | 996 | 40.1 | 12.5 | 3.55 | 1.84 | 2.31 | Not satisfactory measurement |
| Standard deviation Ω · cm | 34.3 | 1.39 | 1.41 | 0.12 | 0.052 | 0.071 | — |
| Coefficient of variation of standard deviation % | 3.44 | 3.46 | 3.27 | 3.38 | 2.83 | 3.07 | — |

*[1]N,N-dibutylbutaneamine was used as an amine catalyst.

*[2]Referring to the electroconductive material, VGCF represents "vapor-growth carbon fiber VGCF (manufactured by Showa Denko K.K.)". EC represents "KETJEN BLACK (manufactured by The Lion Co., Ltd.)."

What is claimed is:

1. An electroconductive resin comprising a film-forming component and a vapor-growth carbon fiber, the vapor-growth carbon fiber being compounded with the film-forming component using a polar organic solvent, wherein the amount of vapor-growth carbon fiber compounded is 1 to 20 parts by weight based on 100 parts by weight of the film-forming component, and wherein said film-forming component comprises a high polymer compound comprising a product by reaction of a mixture containing as major components:

at least one compound selected from the group consisting of:

liquid styrene butadiene rubbers having both end-groups substituted by carboxyl groups, liquid polybutadiene having both end-groups substituted by carboxyl groups, liquid polyisoprene having both end-groups substituted by carboxyl groups, and liquid polychioroprene having both end-groups substituted by carboxyl groups, and at least one epoxy resin compound selected from the group consisting of bisphenol A diylycidyl ether type epoxy resins, bisphenol F diglycidyl ether type epoxy resins, and phenol novolac type epoxy resins.

2. The electroconductive resin according to claim 1, further comprising a tertiary amine catalyst.

3. An electroconductive sheet or film made of an electroconductive resin comprising a film-forming component and a vapor-growth carbon fiber, the vapor-growth carbon fiber being compounded with the film-forming component using a polar organic solvent, and the electroconductive sheet having a thickness of not more than 1 mm, wherein the amount of vapor-growth carbon fiber compounded is 1 to 20 parts by weight based on 100 parts by weight of the film-forming component, and wherein said film-forming component comprises a high polymer compound comprising a product by reaction of a mixture containing as major components:

at least one compound selected from the groups consisting of liquid styrene butadiene rubbers having both end-groups substituted by carboxyl groups, liquid polybutadiene having both end-groups substituted by carboxyl groups, liquid polyisoprene having both end-groups substituted by carboxyl groups, and liquid polychloroprene having both end-groups substituted by carboxyl groups, and at least one epoxy resin compound selected from the group consisting of bisphenol A diglycidyl ether type epoxy resins, bisphenol F diglycidyl ether type epoxy resins, and phenol novolac type epoxy resins.

4. The electroconductive sheet or film according to claim 3, further comprising a tertiary amine catalyst.

5. A composition useful for forming an electroconductive resin comprising a film-forming component and a vapor-growth carbon fiber, the vapor-growth carbon fiber being compounded with the film-forming component using a polar organic solvent, wherein the amount of vapor-growth carbon fiber compounded is 1 to 20 parts by weight based on 100 parts by weight of the film-forming component, and wherein said film-forming component comprises a high polymer compound comprising a product by reaction of a mixture containing as major components: at least one compound selected from the groups consisting of, liquid styrene butadiene rubbers having both end-groups substituted by carboxyl groups, liquid polybutadiene having both end-groups substituted by carboxyl groups, liquid polyisoprene having both end-groups substituted by carboxyl groups, and liquid polychloroprene having both end-groups substituted by carboxyl groups, and at least one epoxy resin compound selected from the group consisting of bisphenol A diglycidyl ether type epoxy resins, bisphenol F diglycidyl ether type epoxy resins, and phenol novolac type epoxy resins.

6. The composition useful for forming an electroconductive resin according to claim 5, further comprising a tertiary amine catalyst.

* * * * *

UNITED STATES PATENT AND TRADEMARK OFFICE

CERTIFICATE OF CORRECTION

PATENT NO. : 7,361,290 B2
APPLICATION NO. : 10/812101
DATED : April 22, 2008
INVENTOR(S) : Teruyoshi Takeuchi It is certified that error appears in the above-identified patent and that said Letters Patent is hereby corrected as shown below:

At column 9, line 20, the word "polychioroprene" should read as -- polychloroprene --.

At column 9, line 24, the word "diylycidyl" should read as -- diglycidyl --.

Signed and Sealed this

Eighth Day of July, 2008

JON W. DUDAS
*Director of the United States Patent and Trademark Office*